US010001799B2

(12) United States Patent
Leinonen et al.

(10) Patent No.: US 10,001,799 B2
(45) Date of Patent: Jun. 19, 2018

(54) PULL-DOWN CIRCUITRY FOR AN APPARATUS

(71) Applicant: Nokia Corporation, Espoo (FI)

(72) Inventors: Pekka Leinonen, Turku (FI); Kai Inha, Jarvenpaa (FI); Pekka Talmola, Turku (FI); Timo Toivola, Turku (FI); Teemu Helenius, Riihikoski (FI); Seppo Jarvensivu, Halikko (FI); Kristian Vaajala, Lieto (FI); Tino Hellberg, Littoinen (FI)

(73) Assignee: Nokia Technologies Oy, Espoo (FI)

( * ) Notice: Subject to any disclaimer, the term of this patent is extended or adjusted under 35 U.S.C. 154(b) by 733 days.

(21) Appl. No.: 14/222,852

(22) Filed: Mar. 24, 2014

(65) Prior Publication Data
US 2015/0268688 A1 Sep. 24, 2015

(51) Int. Cl.
| G05F 3/02 | (2006.01) |
| H01R 13/66 | (2006.01) |
| H01R 13/70 | (2006.01) |
| G06F 13/40 | (2006.01) |

(52) U.S. Cl.
CPC ............. *G05F 3/02* (2013.01); *G06F 13/409* (2013.01); *H01R 13/665* (2013.01); *H01R 13/70* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| 6,441,644 | B1 * | 8/2002 | Tanaka | H03K 17/163 326/27 |
| 7,522,659 | B2 * | 4/2009 | Lacy | G06F 13/4072 326/83 |
| 9,601,073 | B2 * | 3/2017 | Chae | G09G 3/3677 |
| 2008/0247104 | A1 | 10/2008 | Kwak | |
| 2012/0297207 | A1 | 11/2012 | Carlsen et al. | |

(Continued)

FOREIGN PATENT DOCUMENTS

| WO | WO2008146073 | 12/2008 | |
| WO | WO 2008146073 A1 * | 12/2008 | ......... G06F 13/4086 |

OTHER PUBLICATIONS

Universal Serial Bus 3.0 Specification, Revision 1.0, Nov. 12, 2008.
(Continued)

*Primary Examiner* — Daniel Kessie
*Assistant Examiner* — Swarna N Chowdhuri
(74) *Attorney, Agent, or Firm* — Locke Lord LLP

(57) ABSTRACT

Apparatus embodiments of the invention are disclosed for requesting power via a wired interface. In example embodiments, a pull-down circuit in the apparatus acting as a power consumer when there is no energy in the apparatus, is connected via a configuration line over a cable to a power provider device. The apparatus may be in a power down mode, it may have an empty battery, or it may have no battery. The pull-down circuit is configured to use energy from the configuration line to pull down a voltage on the configuration line, to signal the power provider device to provide power over another line of the cable to the apparatus.

12 Claims, 6 Drawing Sheets

(56) References Cited

U.S. PATENT DOCUMENTS

2013/0181660 A1* 7/2013 Zhou .................... H02J 7/0052
320/107
2015/0212497 A1* 7/2015 Dunstan .................... G06F 1/26
307/130

OTHER PUBLICATIONS

Extended European Search Report for Application No. 15160427.9-1953 dated Jun. 10, 2015.

* cited by examiner

FIG. 1B

CONNECTOR 140 OR 170

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1− | VBUS | CC1 | D+ | D− | RFU1 | VBUS | RX2− | RX2+ | GND |
| GND | RX1+ | RX1− | VBUS | RFU2 | D− | D+ | CC2 | VBUS | TX2− | TX2+ | GND |
| B12 | B11 | B10 | B9 | B8 | B7 | B6 | B5 | B4 | B3 | B2 | B1 |

PULL-DOWN CIRCUITRY FOR AN APPARATUS

FIELD

The embodiments relate to an apparatus or dual-role port capability to request power via a wired interface.

BACKGROUND

Serial and parallel communication interfaces are widely used to establish communication between devices such as desktop computers and printers, stationary terminals and peripheral devices, personal computers, mobile terminals, and headsets. Unlike older connection standards such as RS-232 or Parallel port, universal serial bus (USB) ports and cables supply both data and electric power, enabling power consumer devices needing operating power, to obtain their operating power via the USB cable from a power provider device. The power provider devices may also include mains adapters or car chargers without data communication capabilities.

SUMMARY

Apparatus embodiments of the invention are disclosed for requesting power via a wired interface.

According to an example embodiment of the invention, an apparatus comprises:

a pull-down circuit in the apparatus acting as a power consumer when there is no energy in the apparatus, the pull-down circuit being connected via a configuration line over a cable to a power provider device, the pull-down circuit being configured to use energy from the configuration line to pull down a voltage on the configuration line, to signal the power provider device to provide power over another line of the cable to the apparatus.

According to an example embodiment of the invention, an apparatus comprises:

wherein the apparatus is a device with a Dual-Role Port, the pull-down circuit is connected via a Configuration Channel line over a USB-Type C cable to the power provider device, and the other line of the cable is a VBUS line of the USB-Type C cable to the power provider device.

According to an example embodiment of the invention, an apparatus comprises:

wherein the pull-down circuit comprises at least one of an FET circuit, a transistor circuit, a diode circuit, a relay switch, or a MEMS switch that provides the pull-down.

According to an example embodiment of the invention, an apparatus comprises:

wherein the pull-down circuit further comprises an N-channel FET, having its gate coupled through a resistor to the configuration channel line of the cable, its source connected to ground potential, and its drain connected to the configuration channel line of the cable, the N-channel FET being configured to become more conductive, reducing voltage on the configuration channel line of the cable, thereby signaling the power provider device over the configuration channel line, to provide power to the apparatus on the VBUS line of the cable.

According to an example embodiment of the invention, an apparatus comprises:

wherein the pull-down circuit further comprises a p-channel FET, having its gate coupled through a resistor to ground potential, its drain connected to ground potential, and its source connected to the configuration channel line of the cable, the p-channel FET being configured to conduct through its source-drain path, thereby reducing voltage on the configuration channel line of the cable, thereby signaling the power provider device over the configuration channel line, to provide power to the apparatus on the VBUS line of the cable.

According to an example embodiment of the invention, an apparatus comprises:

wherein the pull-down circuit further comprises a diode, with its cathode coupled through a resistor to ground potential and its anode connected to the configuration channel line of the cable, the diode being configured to conduct, thereby reducing voltage on the configuration channel line of the cable, thereby signaling the power provider device over the configuration channel line, to provide power to the apparatus on the VBUS line of the cable.

According to an example embodiment of the invention, an apparatus comprises:

wherein the apparatus is a device with a Device-Role Port, the pull-down circuit is connected via a Configuration Channel line over a USB-Type C cable to the power provider device, and the other line of the cable is a VBUS line of the USB-Type C cable to the power provider device.

According to an example embodiment of the invention, an apparatus comprises:

a pull-down circuit in the apparatus with a Dual-Role Port acting as power consumer when there is no energy in the apparatus, the pull-down circuit being connected via a Configuration Channel line over a USB-Type C cable to a power provider device, the pull-down circuit being configured to use energy from the Configuration Channel line to pull down a voltage on the Configuration Channel line, to signal the power provider device to provide power over a VBUS line of the USB-Type C cable to the apparatus.

According to an example embodiment of the invention, an apparatus comprises:

wherein the apparatus includes a battery that becomes charged by the power provided on the VBUS line and, in response, the pull down circuit stops pulling down the voltage of the Configuration Channel line and releases control of the Configuration Channel to other circuitry having a capability for logic decisions.

According to an example embodiment of the invention, an apparatus comprises:

wherein the apparatus is acting as a power consumer when in a power down mode.

According to an example embodiment of the invention, an apparatus comprises:

wherein the apparatus is acting as a power consumer when it has an empty battery.

According to an example embodiment of the invention, an apparatus comprises:

wherein the apparatus is acting as a power consumer when it has no battery.

In this manner, embodiments of the invention enable requesting power via a wired interface.

DESCRIPTION OF THE FIGURES

FIG. 1B illustrates an example layout of the USB Type-C connector pinning.

DISCUSSION OF EXAMPLE EMBODIMENTS

Figure 1A:
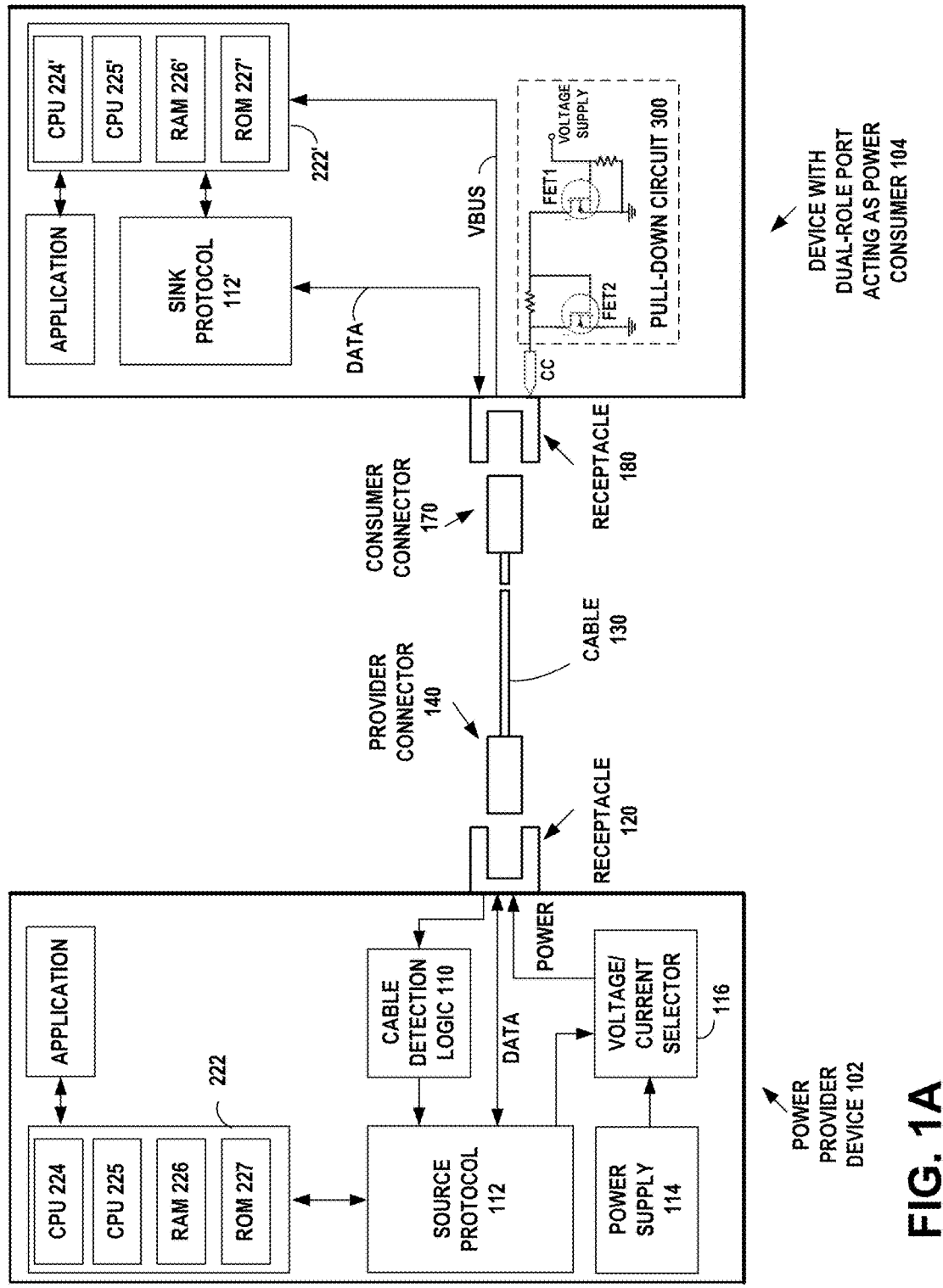
FIG. 1A illustrates an example functional block diagram of a power provider device and a Device with Dual-Role port acting as Power Consumer to be connected by a USB cable.

A USB system may include a host, a plurality of downstream USB ports, and a plurality of peripheral devices connected in a tiered-star topology. Additional USB hubs may be included in the tiers, allowing branching into a tree structure with up to five tier levels. A USB host may have multiple host controllers and each host controller may provide one or more USB ports. Up to 127 devices, including hub devices, may be connected to a single host controller.

A new USB Type-C connector is an interface supporting the USB 3.0 level of communication. The USB Type-C connector features a Dual-Role Port that can operate as either a Downstream Facing Port (DFP) or an Upstream Facing Port (UFP). A Downstream Facing Port typically the ports on a host or the ports on a hub to which devices are connected. An Upstream Facing Port is a port on a device or a hub that connects to a host or the Downstream Facing Port of a hub. The role that the port offers may be fixed to either a Downstream Facing Port (DFP) or an Upstream Facing Port (UFP) or may alternate between the two port states. The port's role may be changed dynamically. The USB Type-C connector is symmetrical so that it may be plugged in both ways, up-side-up or up-side-down. The polarity of the plug and power provider/power consumer role will be configured by a system called Configuration Channel (CC), which has two pins CC1 and CC2 at each receptacle, but only one of them, CC1, is wired trough the cable from the plugs. Using this feature the power provider and power consumer devices may figure out which role they are to play in the connection setup.

Both Configuration Channel (CC)-pins are pulled up in the power provider side and pulled down in the power consumer side by resistors. When the cable is connected between the power provider and power consumer, both may monitor both of the Configuration Channel (CC)-pins and see that at both ends only one pin will change its voltage level. Noting which pin this is, the power provider or device may negotiate which way the plug is inserted locally. After the valid connection is detected, a +5 V VCONN voltage or voltage supply is applied to the unused CC-pin for possible active cables.

In the USB Type-C Dual-Role Port connector, a single connector line (VBUS) may be used as either the power source or the power sink. The power provider and power consumer devices must negotiate this the direction of power at the time of setup. For this negotiation, the device that is to consume power, pulls the voltage of the Configuration Channel (CC) connector line low at the time when galvanic connection between connector contacts is established. This lowering of the voltage in the Configuration Channel (CC) line is detected by the power provider device, thereby establishing their respective roles.

A Dual-Role Port device without power or with a dead battery, needs to act as a power consumer device at setup time, to be able to get charging power from a power provider device or host via the VBUS. To act as a power consumer device, the Dual-Role Port needs to pull the Configuration Channel (CC) line below 1.8V and above 0.4V. A semiconductor switch in the Dual-Role Port device acting as a power consumer, would not be able to connect the Configuration Channel (CC) line to a low voltage level, without having proper operating voltage.

FIG. 1A illustrates an example functional block diagram of a power provider device 102 and a Device with Dual-Role port acting as Power Consumer 104 to be connected by a cable 130, such as for example a USB cable. The connector 140, such as a USB Type-C connector, has an example USB Type-C connector pinning shown in FIG. 1B. The power provider device 102 has a receptacle 120, such as for example a USB type-C receptacle to receive the connector 140 plugged into the receptacle 120. The figure shows the pull-down circuit 300 in the Device with Dual-Role port acting as Power Consumer 104, in accordance with an example embodiment of the invention.

The power provider device 102 may include processing logic 222 that may include one or several central processor units (CPUs) 224 and 225, a random-access memory (RAM) 226, and a read-only memory (ROM) 227. Alternately, processing logic 222 may include programmed logic arrays of sequential and combinatorial logic circuits and state machine logic implementing some or all of the steps performed by embodiments of the invention. The source protocol 112 may be embodied as a programmed sequence of executable instructions stored in the RAM or ROM and executed by the central processor unit (CPU) to carry out the functions of embodiments of the invention.

Power Consumer 104 is an apparatus acting as a power consumer when there is no energy in the apparatus. This means that it may be in a power down mode, or that it may have an empty battery, or that it may have no battery.

Figure 2:
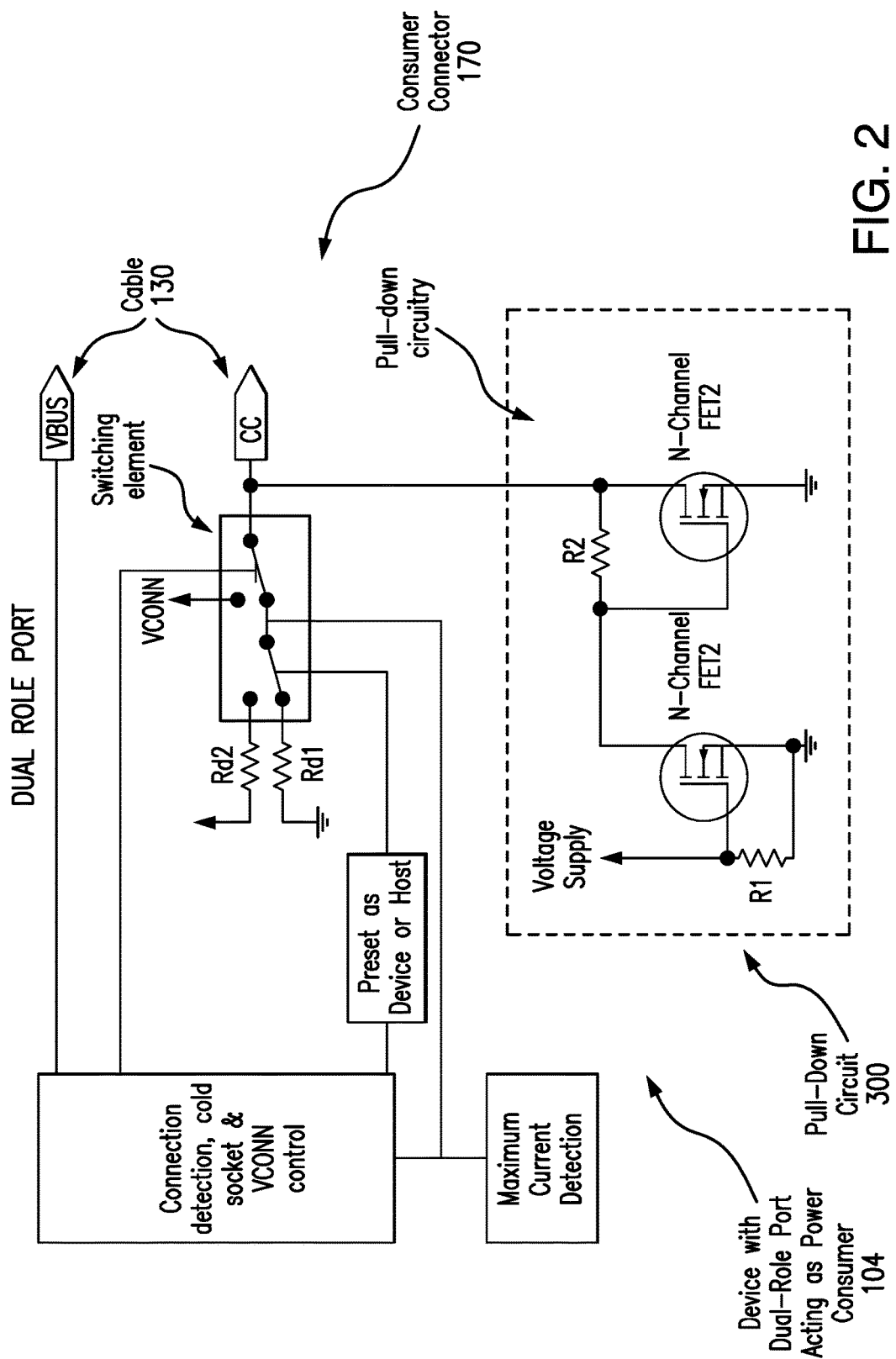
FIG. 2 illustrates an example circuit diagram of an N-channel FET pull-down circuit in the Device with Dual- Role port acting as Power Consumer, in accordance with an example embodiment of the invention.

FIG. 2 illustrates an example circuit diagram of a pull-down circuit 300 in the Device with Dual-Role port acting as Power Consumer 104, in accordance with an example embodiment of the invention. When there is a dead battery, or no power source, inside a device 104 having a Dual-Role port, its Configuration Channel (CC) line must be pulled down in order to get power from a power provider or host 102, in a USB Type-C arrangement. In the USB Type-C arrangement, the power provider or host 104 will not provide any voltage on the VBUS line, before the Configuration Channel (CC) line is pulled down. The Device with Dual-Role port acting as Power Consumer 104 needs to make its Configuration Channel (CC) line to go down, without its having any of its own power available.

In accordance with an example embodiment of the invention, the pull-down circuit 300 in the Device with Dual-Role port acting as Power Consumer 104, uses a bit of energy from the Configuration Channel (CC) line, itself, to pull down the voltage of the Configuration Channel (CC) line, making it go down enough to trigger the power provider or host 104 to start charging the VBUS line. If the Power Consumer device 104 includes a battery that becomes charged by the power provided on the VBUS line, then in response, the pull down circuit 300 stops pulling down the voltage of the Configuration Channel line and releases control of the Configuration Channel to other circuitry having a capability for logic decisions, such as a CPU.

The pull-down circuit 300 in the Device with Dual-Role port acting as Power Consumer 104, may be an FET circuit, transistor, relay, MEMS switch, or another type of circuit that is capable of providing the pull-down, if that device has a dead battery or no power source of its own. Example embodiments of the invention may be more generally applied to power interfaces where the power consumer requests power by pulling a line low, where the device has its own power off or when its battery is empty.

An example n-channel FET pull-down circuit 300 is shown in FIG. 2. In an example embodiment of the invention, the N-channel FET2 has its gate coupled through a resistor R2 to the Configuration Channel (CC) line of the USB-Type C cable, its source connected to ground potential, and its drain connected to the Configuration Channel (CC) line of the cable. The N-channel FET2 is configured to become more conductive, reducing voltage on the Configuration Channel (CC) line of the cable, thereby signaling the power provider device 102 over the Configuration Channel (CC) line, to provide power to the apparatus on the VBUS line of the cable.

When dual role port device 104 is in a power off mode or has a dead battery, the device's VCONN voltage or voltage supply is not present at the gate of FET1 and the FET1 will not conduct. When a power provider or host 102 is attached to this dual role port, it will apply a voltage (VCON) through a resistor to the Configuration Channel (CC) line. This VCONN voltage or voltage supply is applied to the gate of FET2 and FET2 starts to conduct. As FET2 starts to conduct, it will draw the Configuration Channel (CC) line voltage down. At the same time the Configuration Channel (CC) line is drawing the FET2 gate voltage too low to keep FET2 conducting. Thus, FET2 starts to "toggle" and will keep its drain to source voltage of FET2 at approximately its threshold voltage (1.2V threshold recommended). This drain to source voltage of 1.2V is then detected on the Configuration Channel (CC) line by the power provider or host device 102, which indicates to the power provider or host device 102 that it should assume the role of providing power to the Device with Dual-Role port acting as Power Consumer 104, by providing charging power through the VBUS line.

When the power provider or host 102 provides power on the VBUS line to the Device with Dual-Role port acting as Power Consumer 104, the device 104 will either power itself up (if that is its required functionality) or first start to charge its dead battery and power-up (if required) after the level of its battery charge is in a "battery good"-level. When the device 104 succeeds in powering up, it will provide its VCONN voltage or voltage supply to the gate of FET1, and when FET1 becomes conductive, it lowers the voltage on the gate of FET2, thereby turning FET2 off and raising the voltage on the Configuration Channel (CC). The power provider or host device 102 will detect the rise in voltage on the Configuration Channel (CC) line and may reduce or stop providing power on the VBUS line to the device 104. If the device 104 has a limited amount of charge in reserve and later depletes its charge, the pull-down circuit 300, once again, will signal the power provider or host device 102 to resume providing power on the VBUS line.

Figure 2A:
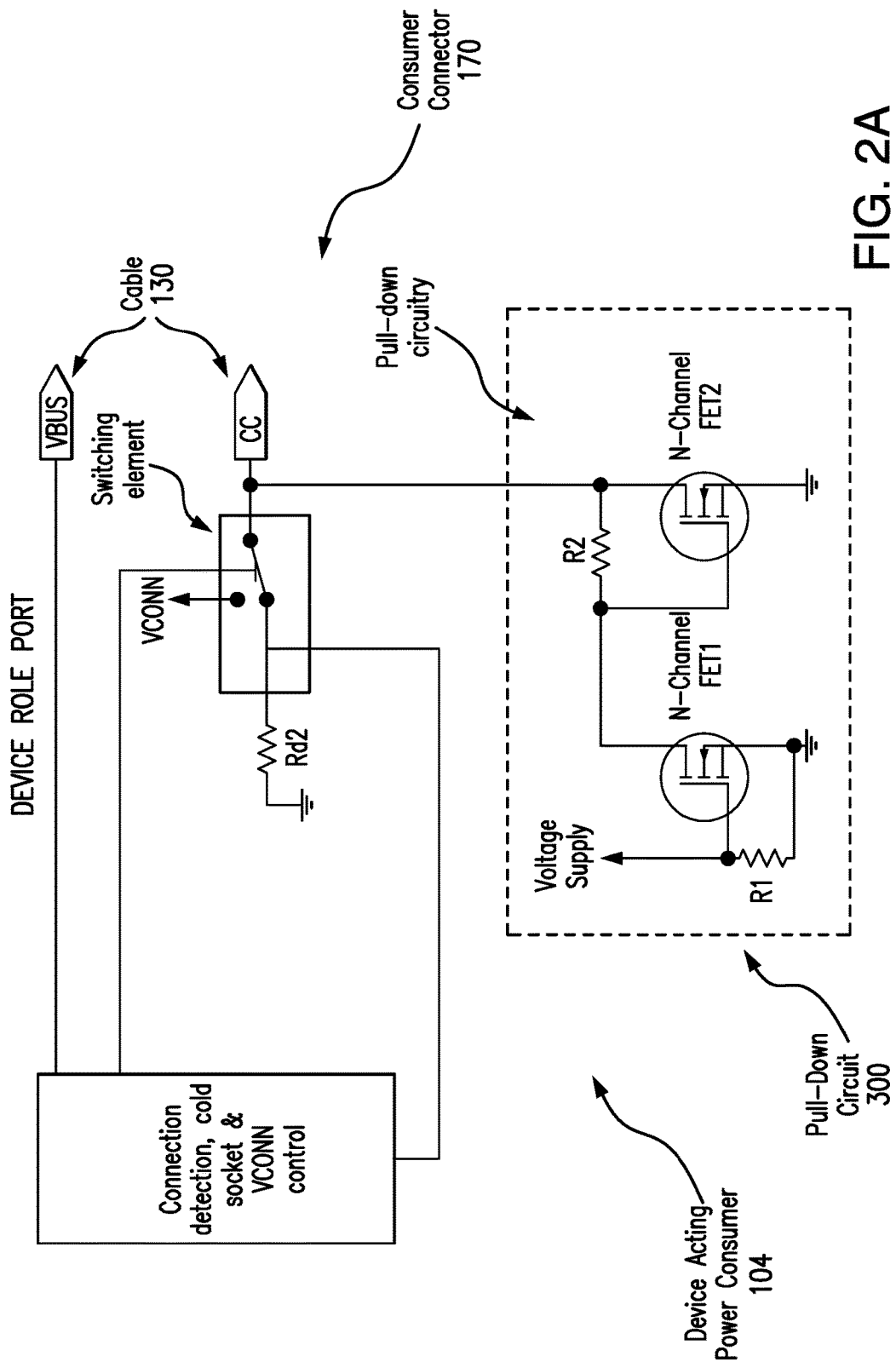
FIG. 2A illustrates an example circuit diagram of an N-channel FET pull-down circuit in the Device with Device-Role port acting as Power Consumer, in accordance with an example embodiment of the invention.

FIG. 2A illustrates an example circuit diagram of an N-channel FET pull-down circuit in the Device with Device-Role port acting as Power Consumer, in accordance with an example embodiment of the invention. The situation is same with the device-mode port devices as per USB Type-C specification. Those device-mode devices need to support VCONN or voltage supply for the active cables, which leads to situation that devices need to have capability to switch pull down off as well.

Figure 3:
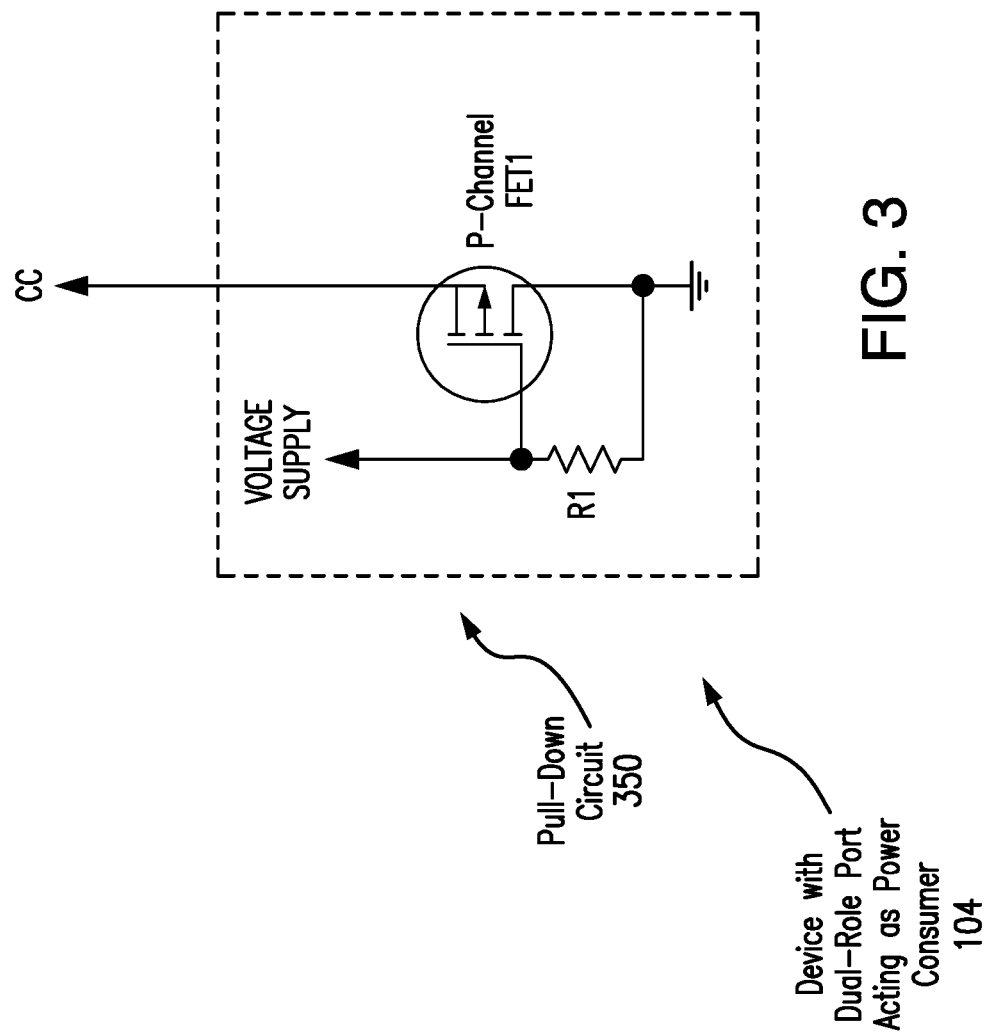
FIG. 3 illustrates an example circuit diagram of a P-channel FET pull-down circuit in the Device with Dual-Role port acting as Power Consumer, in accordance with an example embodiment of the invention.

FIG. 3 illustrates an example circuit diagram of a P-channel FET pull-down circuit 350 in the dual role port in the Device with Dual-Role port acting as Power Consumer 104, in accordance with an example embodiment of the invention. The p-channel FET1 has its gate coupled through a resistor R1 to ground potential, its drain connected to ground potential, and its source connected to the Configuration Channel (CC) of the USB-Type C cable. The p-channel FET1 is configured to conduct through its source-drain path, thereby reducing voltage on the Configuration Channel (CC) line of the cable, thereby signaling the power provider device over the Configuration Channel (CC) line, to provide power to the apparatus on the VBUS line of the cable.

When a dual role port device 104 is in power off mode or with dead battery, its VCONN or voltage supply is not present and P-channel FET1 will conduct, since its gate is grounded. When a power provider or host device 102 is attached to the dual role port device 104, power provider or host device 102 will apply voltage (VCON) through a resistor to the Configuration Channel (CC) line. P-channel FET1 will draw Configuration Channel (CC) line voltage down and will keep its drain to source voltage around the FETs threshold voltage (1.2V threshold recommended). This drain to source voltage of 1.2V is then detected on the Configuration Channel (CC) line by the power provider or host device 102, which indicates to the power provider or host device 102 that it should assume the role of providing power to the device 104, by providing charging power through the VBUS line.

When the power provider or host 102 provides power on the VBUS line to the Device with Dual-Role port acting as Power Consumer 104, the power consumer device 104 will either power itself up (if that is its required functionality) or first start to charge its dead battery and power-up (if required) after the level of its battery charge is in a "battery good"-level. When the device 104 succeeds in powering up, it will provide its VCONN voltage or voltage supply to the gate of P-channel FET1, and when P-channel FET1 stops conducting, it raises the voltage on the Configuration Channel (CC). The power provider or host device 102 will detect the rise in voltage on the Configuration Channel (CC) line and may reduce or stop providing power on the VBUS line to the device 104. If the device 104 has a limited amount of charge in reserve and later depletes its charge, the pull-down circuit 350, once again, will signal the power provider or host device 102 to resume providing power on the VBUS line.

Figure 4:
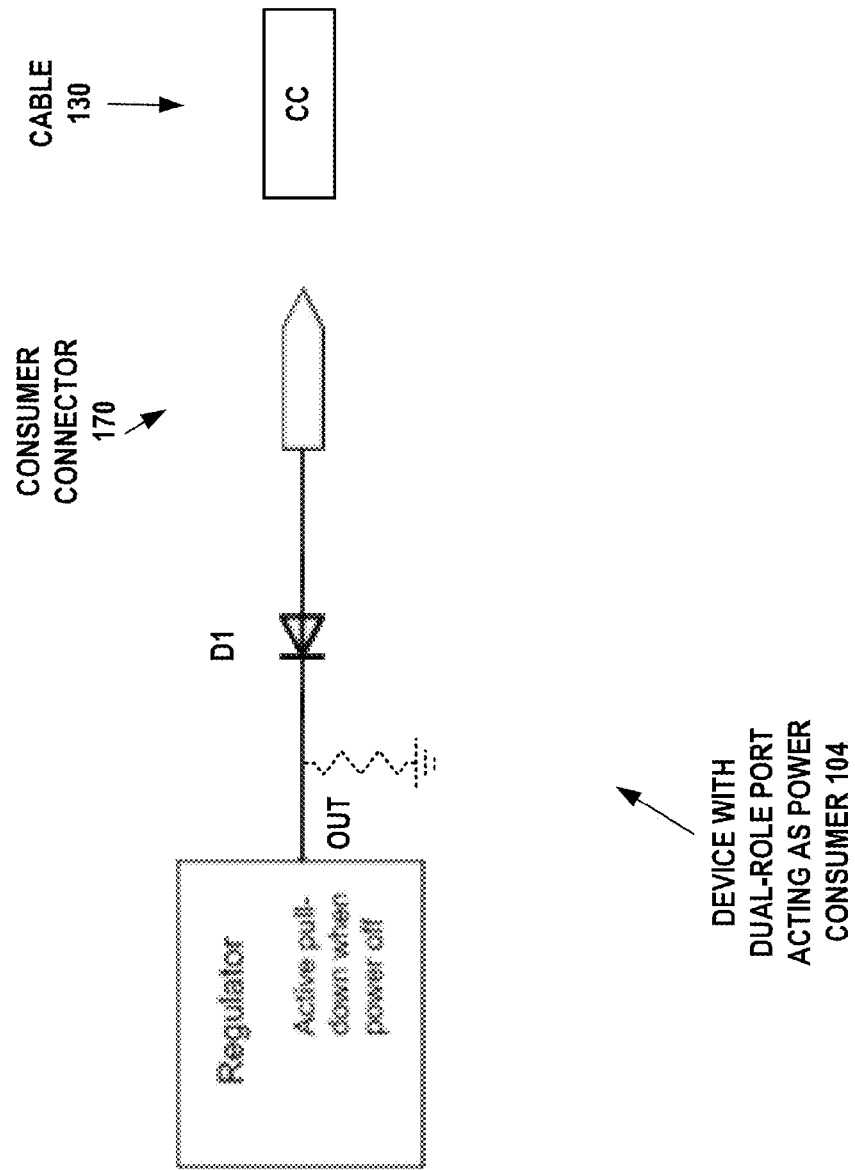
FIG. 4 illustrates an example circuit diagram of a diode pull-down circuit in the Device with Dual-Role port acting as Power Consumer, in accordance with an example embodiment of the invention.

FIG. 4 illustrates an example circuit diagram of a diode pull-down circuit in the dual role port in the power consumer device, in accordance with an example embodiment of the invention. The diode D1 which is connected to the output terminal VCONN regulator as the pull-down device. The output terminal may be connected through a resistance, to ground potential. The Configuration Channel (CC) line is pulled low via the diode D1. The diode is configured to conduct, thereby reducing voltage on the Configuration Channel (CC) line of the USB-Type C cable, thereby signaling the power provider device over the Configuration Channel (CC) line, to provide power to the apparatus on the VBUS line of the cable.

Using the description provided herein, the embodiments may be implemented as a machine, process, or article of manufacture by using standard programming and/or engineering techniques to produce programming software, firmware, hardware or any combination thereof.

Some or all of the steps disclosed herein may be embodied as hardware program logic included in programmed logic arrays of sequential and/or combinatorial logic circuits and/or state machine logic implementing some or all of the steps performed by embodiments of the invention.

Any resulting program(s), having computer-readable program code, may be embodied on one or more computer-usable non-transitory media such as resident memory devices, smart cards or other removable memory devices, or transmitting devices, thereby making a computer program product or article of manufacture according to the embodiments.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. An apparatus, comprising:
a pull-down circuit in the apparatus with a dual-role capability acting as a power consumer when there is no energy in the apparatus, the pull-down circuit being connected via a configuration line over a USB-Type C cable to a power provider device, the pull-down circuit being configured to use energy from the configuration line to pull down a voltage on the configuration line, to signal the power provider device to provide power over a VBUS line of the USB-Type C cable to the apparatus;
wherein the pull-down circuit comprises at least one of an FET circuit, a transistor circuit, a diode circuit, a relay switch, or a MEMS switch.

2. The apparatus of claim 1, wherein the pull-down circuit further comprises: an N-channel FET, having its gate coupled through a resistor to the configuration channel line of the cable, its source connected to ground potential, and its drain connected to the configuration channel line of the cable, the N-channel FET being configured to become more conductive, reducing voltage on the configuration channel line of the cable, thereby signaling the power provider device over the configuration channel line, to provide power to the apparatus on the VBUS line of the cable.

3. The apparatus of claim 1, wherein the pull-down circuit further comprises: a p-channel FET, having its gate coupled through a resistor to ground potential, its drain connected to ground potential, and its source connected to the configuration channel line of the cable, the p-channel FET being configured to conduct through its source-drain path, thereby reducing voltage on the configuration channel line of the cable, thereby signaling the power provider device over the configuration channel line, to provide power to the apparatus on the VBUS line of the cable.

4. The apparatus of claim 1, wherein the pull-down circuit further comprises: a diode, with its cathode coupled through a resistor to ground potential and its anode connected to the configuration channel line of the cable, the diode being configured to conduct, thereby reducing voltage on the configuration channel line of the cable, thereby signaling the power provider device over the configuration channel line, to provide power to the apparatus on the VBUS line of the cable.

5. The apparatus of claim 1, wherein the apparatus is acting as a power consumer when in a power down mode.

6. The apparatus of claim 1, wherein apparatus is acting as a power consumer when it has an empty battery.

7. The apparatus of claim 1, wherein apparatus is acting as a power consumer when it has no battery.

8. An apparatus, comprising:
a pull-down circuit in the apparatus with a Dual-Role Port acting as power consumer when there is no energy in the apparatus, the pull-down circuit being connected via a Configuration Channel line over a USB-Type C cable to a power provider device, the pull-down circuit being configured to use energy from the Configuration Channel line to pull down a voltage on the Configuration Channel line, to signal the power provider device to provide power over a VBUS line of the USB-Type C cable to the apparatus.

9. The apparatus of claim 8, wherein the apparatus includes a battery that becomes charged by the power provided on the VBUS line and, in response, the pull down circuit stops pulling down the voltage of the Configuration Channel line and releases control of the Configuration Channel to other circuitry having a capability for logic decisions.

10. The apparatus of claim 8, wherein the apparatus is acting as a power consumer when in a power down mode.

11. The apparatus of claim 8, wherein apparatus is acting as a power consumer when it has an empty battery.

12. The apparatus of claim 8, wherein apparatus is acting as a power onscumer when it has no battery.

* * * * *